April 25, 1967  L. B. MYTINGER  3,315,715
TILTING ARBOR SAW
Filed May 17, 1965  4 Sheets-Sheet 1
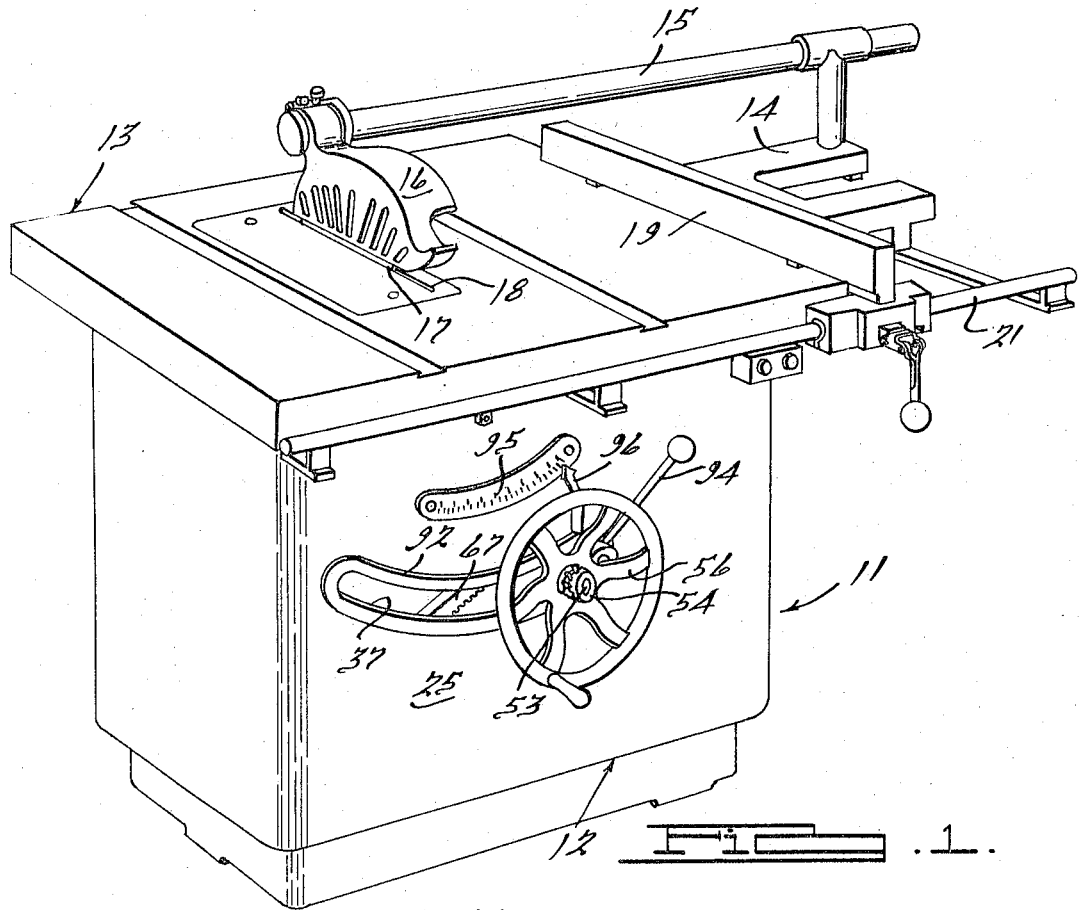
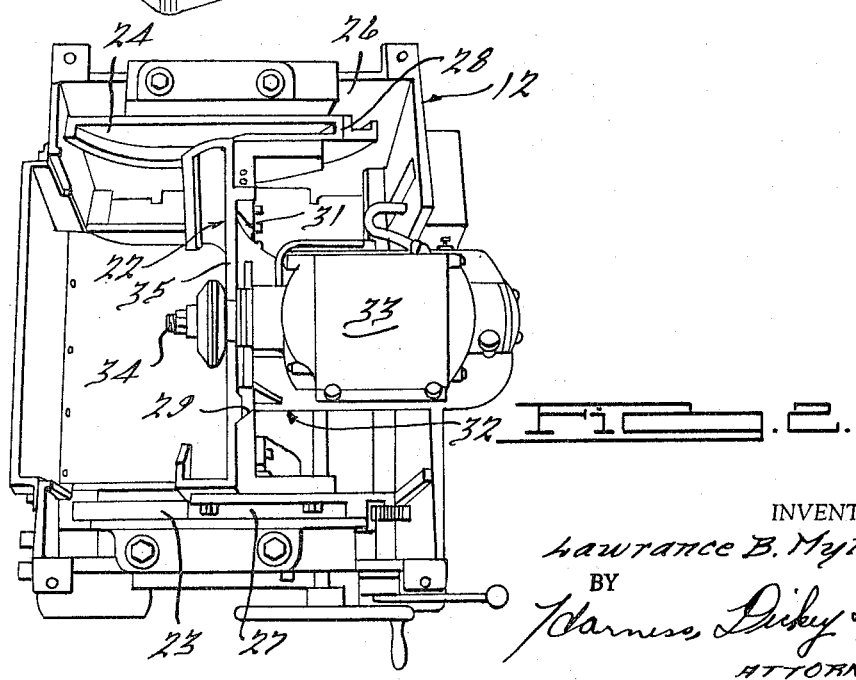
INVENTOR.
Lawrance B. Mytinger
BY
Harness, Dickey & Pierce
ATTORNEYS.

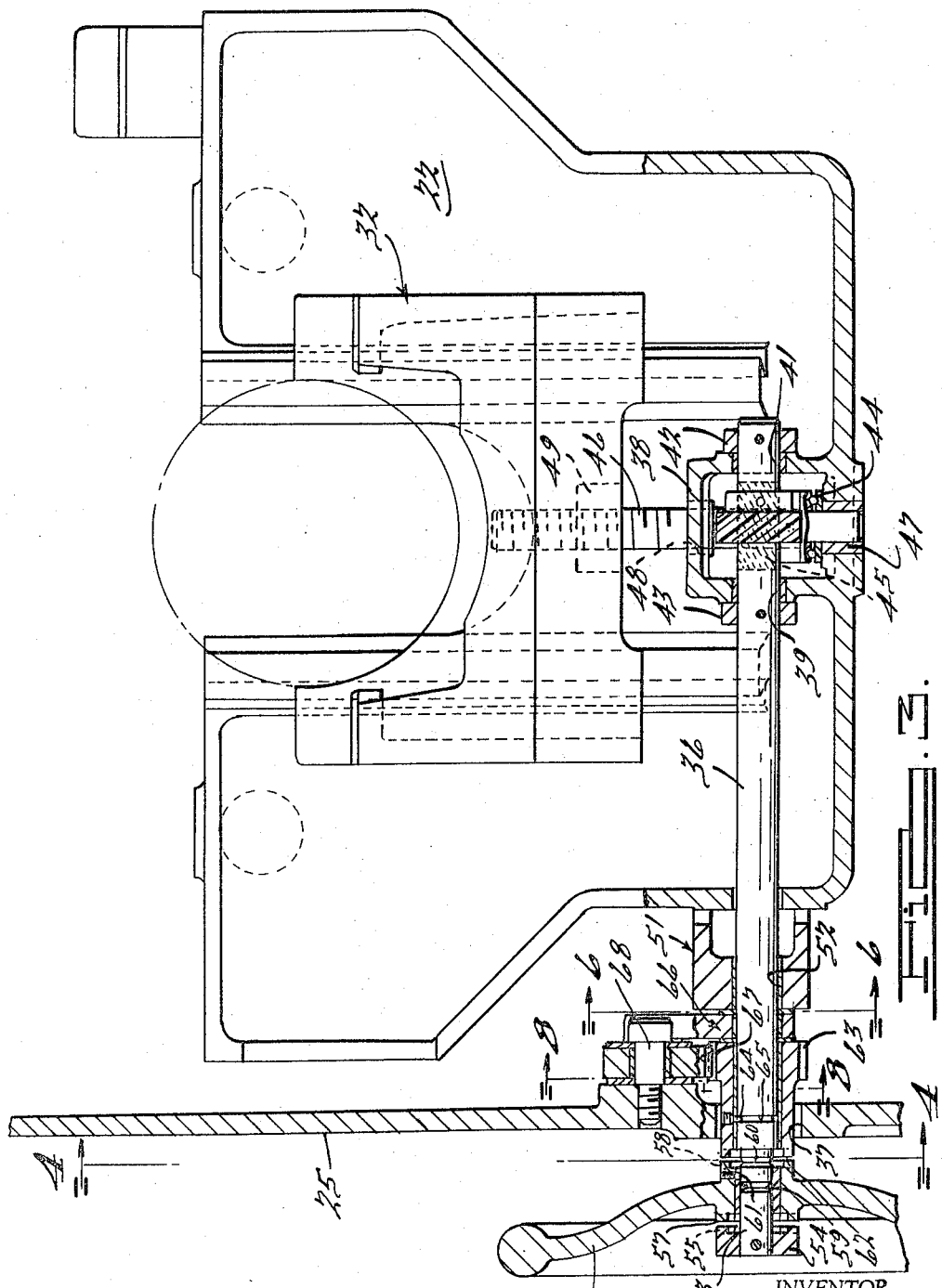

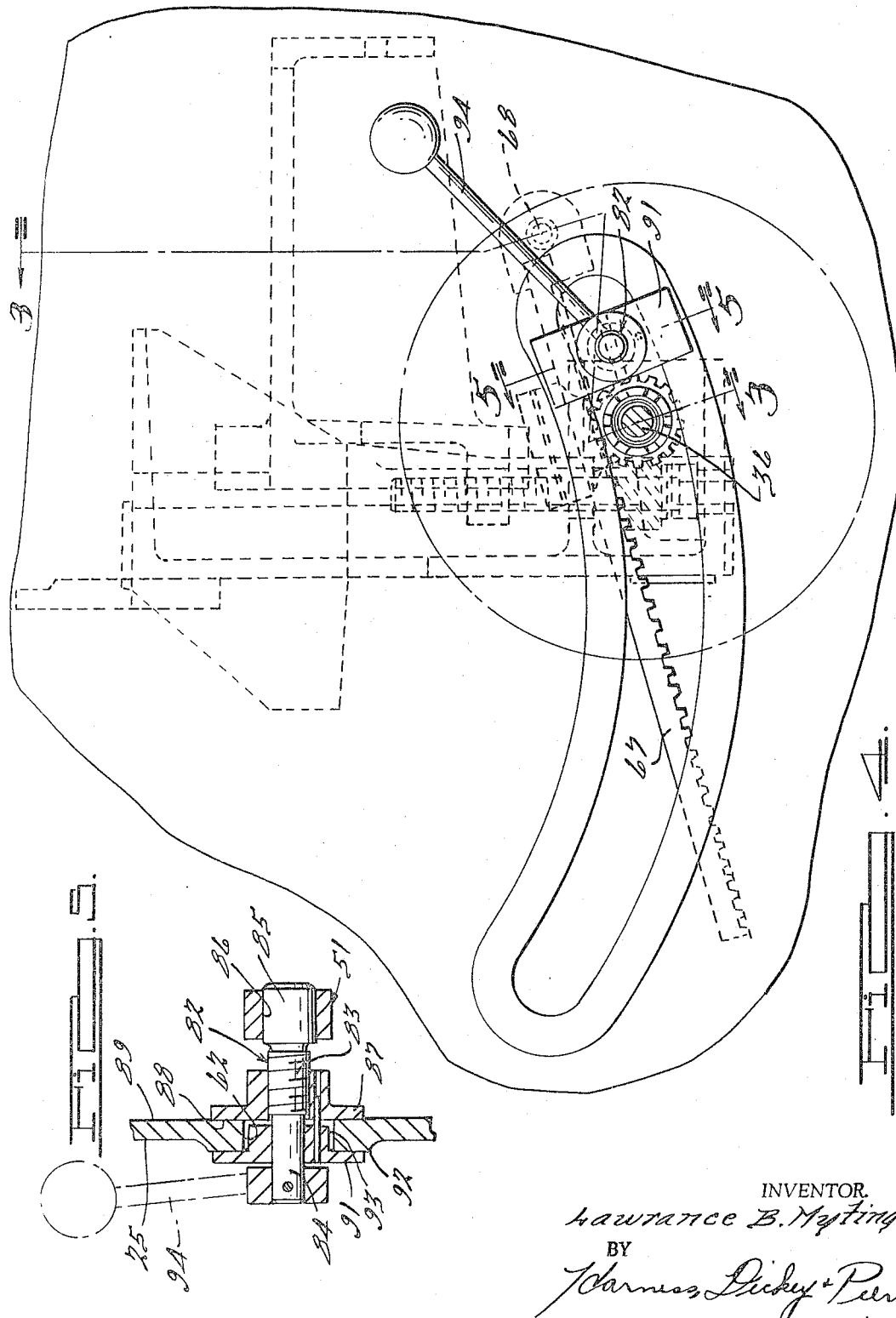

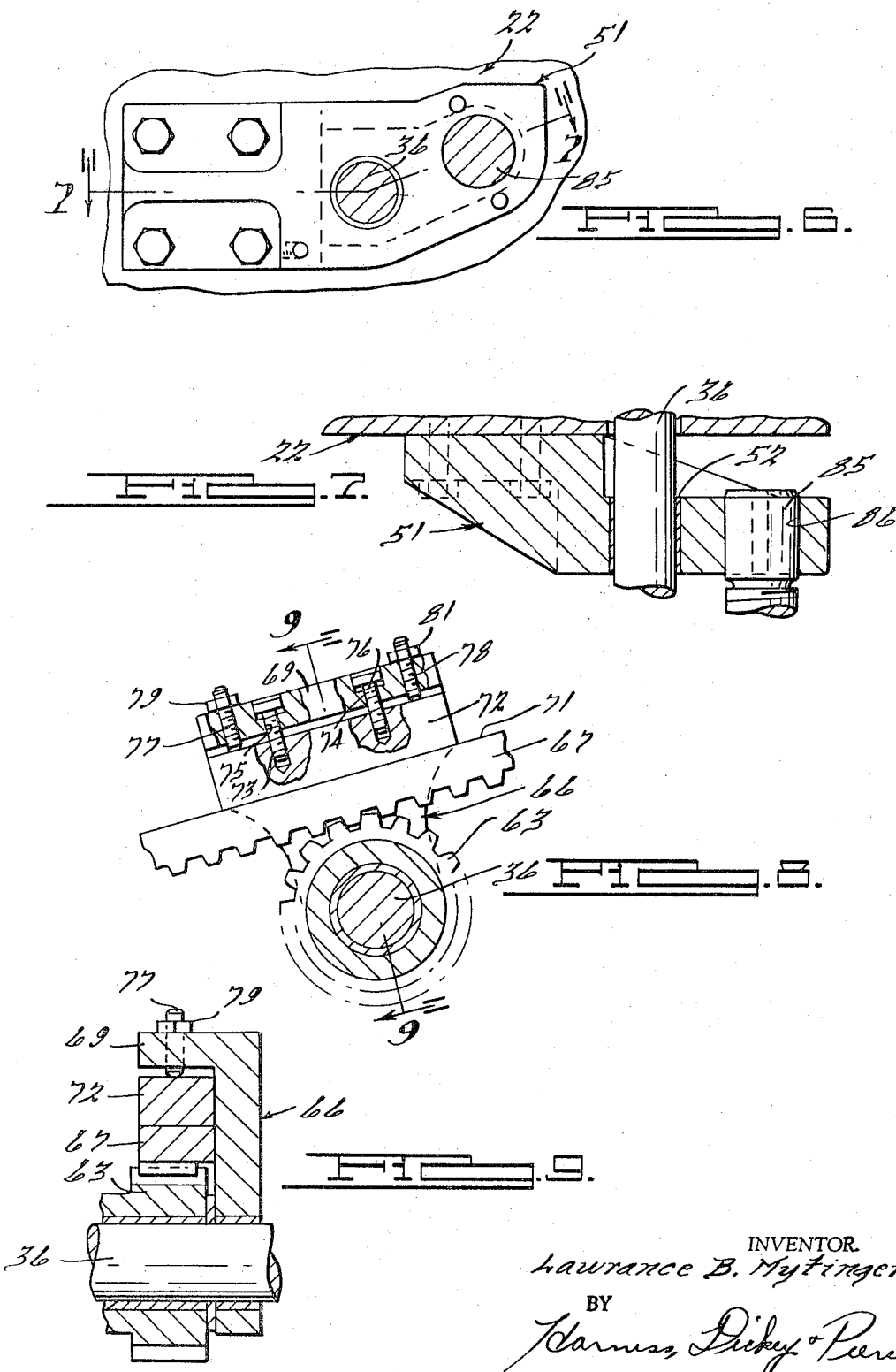

United States Patent Office 3,315,715
Patented Apr. 25, 1967

3,315,715
TILTING ARBOR SAW
Lawrance B. Mytinger, Port Huron, Mich., assignor to Moak Machine and Foundry Company, Port Huron, Mich., a corporation of Michigan
Filed May 17, 1965, Ser. No. 456,129
9 Claims. (Cl. 143—36)

This invention relates to tilting arbor saws, and more particularly to elevating, tilting and locking mechanisms therefor. It is an object of the present invention to provide a novel and improved tilting arbor saw which includes a unitary elevation and tilt control of greatly simplified construction which is economical to fabricate and is reliable in use.

It is another object to provide an improved tilting arbor saw of this nature which minimizes backlash between the tilt pinion and rack, thus increasing the accuracy of tilt adjustment.

It is a further object to provide an improved tilting arbor saw having these characteristics, which includes a novel apron locking device which is of simple construction, is independent of the tilting mechanism and positively locks the apron without creating shifting forces thereon.

Other objects, features and advantages of the present invention will become apparent from the subsequent description and the appended claims, taken in conjunction with the accompanying drawings, in which:

FIGURE 1 is a perspective view of a tilting arbor saw incorporating the principles of this invention;

FIGURE 2 is a top perspective view of the saw with the table removed, showing the pivotal apron supporting means and the ways for the arbor carriage;

FIGURE 3 is a cross-sectional view in elevation taken along the line 3—3 of FIGURE 4, parts being omitted, and showing the gear connection between the carriage adjustment shaft and the arbor carriage, as well as the trunnion support for the rack and the clutches for connecting the hand wheel to the tilt adjusting pinion or the carriage adjustment shaft;

FIGURE 4 is a fragmentary front elevational view taken along the line 4—4 of FIGURE 3 and showing the position of the rack as well as the arcuate clearance slot for the vertical adjusting shaft and tilt adjusting pinion;

FIGURE 5 is a fragmentary cross-sectional view taken along the line 5—5 of FIGURE 4 and showing the apron locking means;

FIGURE 6 is a fragmentary elevational view taken along the lines 6—6 of FIGURE 3, and showing the bracket secured to the apron which serves as a bearing support for the carriage adjustment shaft and the lock screw;

FIGURE 7 is a plan cross-sectional view taken along the line 7—7 of FIGURE 6 and showing further details of the bracket construction;

FIGURE 8 is a fragmentary cross-sectional view of the rack follower and its shoe, taken along the line 8—8 of FIGURE 3, and showing the means for adjusting the position of the shoe with respect to the rack, and FIGURE 9 is a cross-sectional view of the follower, shoe, rack and pinion taken along the line 9—9 of FIGURE 8.

Briefly, the illustrated embodiment of the invention comprises an upright frame of rectangular shape, with a table and an apron rockably supported beneath the table and slidably supporting an arbor carriage. An electric motor mounted on the carriage drives a spindle for a circular saw extending through a slot in the table.

A carriage adjusting shaft is rotatably supported by the apron and is connected by spiral gears with an adjusting screw for the carriage. This shaft extends through an arcuate slot in the front wall of the frame, and carries a pinion which meshes with a standard rack of square cross section. One end of this rack is rockably mounted by a trunnion on the inner surface on the front frame wall. An L-shaped follower is rotatably mounted on the shaft and has a portion overlying the rack. A retaining shoe is disposed between the upper surface of the rack and the portion of the follower above it. A pair of guide bolts are threaded in the upper portion of the shoe and are slidably mounted in the follower to prevent relative movement of the shoe and follower in the direction of extent of the rack, but permitting relative movement between the shoe and follower in a direction perpendicular to the extent of the rack. A pair of set screws are threadably mounted in the follower and engage the upper surface of the shoe. The length of these set screws may be varied, thereby preselecting the clearance between the pinion and rack and keeping backlash to a minimum.

A hand wheel is rotatably mounted on the shaft outwardly of the frame, and has axially extending teeth on opposite sides of its hub. These teeth form elements of two clutches, one for rotating the carriage adjusting shaft and the other for rotating the tilt adjusting pinion. A clutch element fixed to the outer end of the carriage adjusting shaft, and another clutch element formed on the tilt adjusting pinion, coact with the hand wheel clutch elements. The distance between the apron rocking axis and the pinion axis relative to the fixed diameter of the pinion is such that the apron may be tilted between its extreme positions with only a few turns of the hand wheel.

An apron locking device is provided, comprising a screw extending through the arcuate slot and having its inner end rotatably supported by a bracket attached to the apron. A threaded intermediate portion of the locking screw carries a first clamping element engageable with the inner surface of the front frame wall. A second clamping element is rotatably mounted on the locking screw and is frictionally engageable with a boss which surrounds the arcuate slot on the exterior of the front frame wall. The two locking elements are keyed to each other, and the outer locking element is of non-circular cross section so that it cannot rotate with respect to the locking screw axis. Rotation of the locking shoe by a handle secured to its outer end will therefore firmly secure the apron in its tilted position.

Referring more particularly to the drawings, FIGURE 1 shows a tilting arbor saw generally indicated at 11, the saw comprising a rectangular base or frame, generally indicated at 12, and a table generally indicated at 13 resting on frame 12. An extension 14 on the right side of saw 11 supports an arm 15 which carries a guard 16 for the circular saw 17. The saw extends through a slot 18 in table 13. A fence 19 rests on table 13, the fence being adjustable to tilt left or right and being guided by a bar 21 mounted on the front of the table.

An apron generally indicated at 22 is rockably mounted within frame 12. More particularly, a pair of segments 23 and 24 are secured to the upper portion of frame 11 below table 13 and inwardly of the front wall 25 and rear wall 26 respectively, as seen in FIGURE 2. Apron 22 has a main portion extending between segments 23 and 24, with arcuate members 27 and 28 supported by segments 23 and 24 respectively, thus permitting rocking of the apron about a horizontal fore-and-aft axis.

Ways 29 and 31 are provided on the central portion of apron 22, these ways supporting and guiding an arbor carriage generally indicated at 32. Carriage 32 supports an electric motor 33 which has an arbor 34 extending through a recess 35 in apron 22, the arbor being adapted to support circular saw 17.

Means are provided for raising and lowering carriage 32 with respect to apron 22, and also for tilting apron 22

(together with carriage 32) about a horizontal axis. This means included carriage adjustment shaft 36 which is rotatably mounted on a horizontal axis at the lower portion of apron 22 and extends through an arcuate clearance slot 37 in the forward wall 25 of frame 12. The means for rotatably supporting shaft 36 comprises a gear box 38 formed on apron 22, as seen in FIGURE 3, this gear box carrying a pair of aligned bearings 39 and 41 through which shaft 36 extends. A pair of collars 42 and 43 are provided for preventing axial movement of shaft 36 with respect to gear box 38. A spiral gear 44 is mounted on shaft 36 within gear box 38 and meshes with a spiral gear 45 mounted on the lower end of a lead screw 46. Gears 44 and 45 are within gear box 38, and lead screw 46 extends upwardly therefrom, being rotatably supported by bearings 47 and 48. Lead screw 46 is threadably mounted in a nut 49 carried by the lower end of carriage 32.

A bracket generally indicated 51 is secured to the forward side of apron 22, and has a bearing 52 through which shaft 36 extends, as seen in FIGURES 6 and 7. The outer end 53 of shaft 36 is reduced, and carries a clutch element 54 having a plurality of teeth 55 which extend axially toward the frame. A hand wheel 56 is mounted on shaft portion 53 adjacent clutch element 54. This hand wheel has a plurality of clutch teeth 57 which extend axially toward clutch teeth 56.

Hand wheel 56 is mounted on shaft portion 53 so as to permit both rotational and axial movement with respect to the shaft. The rearwardly facing side of the hub of hand wheel 56 has a second set of clutch teeth 58 which, like clutch teeth 57, extend axially. Shaft portion 53 has a pair of circumferentially extending grooves 59 and 60 which coact with a spring-urged ball detent 61 carried by the hub of hand wheel 56. The hand wheel is thus adjustable between a first or forward position in which clutch teeth 55 and 57 are engaged, and a second or rearward position in which clutch teeth 58 engage clutch teeth 62 of a tilt adjustment pinion 63 rotatably but non-slidably mounted on shaft 36.

Pinion 63 has an elongated hub which extends through slot 37 and the forward end of which carries clutch teeth 62. The pinion is rotatably and non-slidably connected to shaft 36 by a pin 64 on its hub which extends into a slot 65 in the shaft. The location of the pinion 63 relative to the forward surface of bracket 51 is such that a space is provided therebetween, this space is fully occupied by a rack follower 66, which is described in detail below.

Pinion 63 is engageable with a gear rack 67 which is best seen in FIGURES 3 and 4. This rack extends parallel to and behind forward wall 25 of frame 12. The right hand end of rack 67, as seen in FIGURE 4, is pivotally connected by a trunnion mounting 68 to forward wall 25, so that the rack is free to rock in a vertical plane. The rack rests on and meshes with pinion 63, and is held in proper meshing engagement therewith by follower 66. This follower is an L-shaped member having one arm disposed between pinion 63 and bracket 51, and the other arm 69 disposed above the upper smooth surface 71 of the rack, as seen in FIGURES 8 and 9.

The means for insuring proper meshing engagement between the pinion and rack without appreciable backlash, comprises a shoe 72 disposed between arm 69 of the follower and upper surface 71 of rack 67. A pair of guide members 73 and 74 are threadably mounted in shoe 72 and extend upwardly through guide apertures 75 and 76 respectively in follower arm 69. The heads of screws 73 are disposed in counterbored portions of apertures 75 and 76, but relative movement between shoe 72 and follower arm 69 in a direction toward and away from rack 67 is permitted. A pair of adjusting screws 77 and 78 are provided, these screws being threadably mounted in follower arms 69 and engaging the upper surface of shoe 72. Lock nuts 79 and 81 are provided for screws 77 and 78 respectively. By adjusting the positions of screws 77 and 78, rack 67 and pinion 63 may be relatively adjusted to minimize play therebetween. Proper adjustment of shoe 2 will thus assure long life for the pinion and rack. It will be noted that this feature permits the use of a standard square cross section rack of economical construction.

The distance between the pivotal axis of apron 22 and shaft 36 relative to the pitch diameter of pinion 63, is such that the apron may be tilted between its extreme positions with a minimum number of turns of hand wheel 56. In a suitable construction, for example, the apron may be moved between 10° and 45° positions with two-and-one-half turns by the hand wheel.

Means are provided for locking apron 22 in its adjusted position. This means includes a locking screw generally indicated at 82, as seen in FIGURE 5, this screw having an intermediate threaded portion 83, a forward portion 84 extending through slot 62, and a rear portion 85 rotatably mounted in an aperture 86 of bracket 51, as seen in FIGURE 7. Shaft 82 is disposed just to the right of shaft 36, as seen in FIGURES 1 and 4. A first clamping member 87 is threadably mounted on portion 83 of screw 82. Member 87 as a flat surface 88 engageable with the inner surface 89 of forward frame wall 25 adjacent slot 62, as seen in FIGURE 5. A second clamping member 91 is mounted on portion 84 of screw 82 within and immediately forwardly of slot 62. The portion of member 91 which is within slot 62 is of non-circular cross-sectional shape and of such dimensions as to prevent it from rotating relative to the slot. A boss 92 is provided around slot 37, this boss having a flat surface which is engageable by the wider portion of member 91. A pin 93 connects members 87 and 91 so as to prevent rotation of member 87 but permit relative axial movement therebetween.

A handle 94 is secured to the forward end of screw portion 82, as seen in FIGURES 1, 4 and 5. When handle 94 is rotated in one direction, it will therefore cause clamping members 87 and 91 to spread apart in an axial direction, releasing them from frictional engagement with wall 25. Rotation of handle 94 in the opposite direction will cause the clamping members to frictionally engage wall 25 and thus lock apron 22 in its tilted position. It should be observed that the action of the locking means is independent of the tilting mechanism and that no lateral forces will be exerted by it on the apron which might tend to shift it out of position.

In operation, to adjust the height of saw 17, the handle will be pulled forwardly so as to engage teeth 55 and 57, with detent 61 engaging groove 59. Rotation of the hand wheel will thus cause rotation of lead screw 46 through gears 44 and 45, adjusting carriage 32 in ways 29 and 31. After this adjustment has been completed, and with handle 94 swung to an unlocking position, hand wheel 56 will be pushed rearwardly, disengaging clutch teeth 55 and 57 and engaging clutch teeth 58 and 61, with detent 61 entering slot 60. Further rotation of the hand wheel will cause pinion 63 to travel along rack 67, the rack swinging about pivot 68 to adjust itself during this movement. A scale 95 may be provided on forward wall 25, coacting with a pointer 96 movable with pinion 63. When the proper tilt angle is arrived at, handle 94 will be swung to its locking position, causing members 87 and 91 to lock the apron in position.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

What is claimed is:

1. In a tilting arbor saw, a frame having a forward wall, an apron rockably mounted on said frame, an arcuate slot in said forward wall, a shaft extending through said slot, means on said apron rotatably supporting said shaft, a hand wheel on said shaft forwardly of said forward wall, a pinion on said shaft, a straight rack of rectangular cross-sectional shape pivotally mounted at one end to the rear surface of said forward wall and meshing with said pinion, and follower means carried by said shaft and engageable with said rack on the side facing away from said pinion.

2. The combination according to claim 1, said follower means comprising a member having a first arm rotatably mounted on said shaft and a second arm extending over said rack, a shoe disposed between said second arm and the upper surface of said rack, and means for adjusting the distance between said shoe and said second arm.

3. The combination according to claim 2, said last-mentioned means comprising guide members secured to said shoe and slidable in apertured portions of said second arm, adjusting screws threadably mounted in said second arm and engageable with said shoe, and lock nuts for said ajdusting screws.

4. In a tilting arbor saw, a frame having a forward wall, an apron rockably mounted on said frame, an arbor carriage, ways on said apron slidably supporting said arbor carriage, an arcuate slot in said forward wall, a shaft extending through said arcuate slot and into the lower portion of said apron, means on said apron rotatably but non-slidably supporting said shaft, a lead screw, means on said apron rotatably but non-slidably supporting said lead screw, gears connecting said shaft and said lead screw, a clutch element on the portion of said shaft forwardly of said wall and having axially extending teeth, a hand wheel rotatably mounted on said shaft rearwardly of said clutch element and having a first set of clutch teeth extending toward said first-mentioned clutch teeth, whereby rotation of said hand wheel when said two sets of clutch teeth are engaged with the hand wheel in a first position will permit raising or lowering of said carriage with respect to said apron, a pinion rotatably but non-slidably mounted on said shaft rearwardly of said wall and having a hub portion extending forwardly through said slot, axially extending clutch teeth on said hub portion, a second set of axially extending clutch teeth on said hand wheel engageable with said pinion clutch teeth when said hand wheel is shifted rearwardly on said shaft from said first position, a standard straight machined steel rack disposed against the rear surface of said forward frame wall, a pivotal trunnion connection between one end of said rack and said forward wall permitting free rocking of said rack, the teeth of said rack facing downwardly and engaging said pinion, an L-shaped follower having a first arm rotatably mounted on said shaft rearwardly of said pinion and a second arm extending over said rack, a shoe disposed between said second arm and said rack and engageable with the flat upper surface thereof, and means for adjusting the spacing between said second arm and said shoe, whereby backlash between said rack and said pinion may be minimized.

5. The combination according to claim 4, further provided with a bracket secured to said apron between the first arm of said follower and the apron, said bracket having a bearing supporting an intermediate portion of said shaft and being of such size as to prevent substantial relative movement between the follower and the apron in the direction of the shaft axis.

6. The combination according to claim 4, further provided with a locking mechanism comprising a locking screw extending through said slot adjacent said shaft but independent thereof, said screw having an intermediate threaded portion, a first clamping member threadably mounted on said threaded portion and having a surface facing the rear surface of said forward wall, a second clamping member rotatably mounted on said screw forwardly of said first clamping member and having a portion engageable with the forward surface of said forward wall, means preventing rotation of said clamping member relative to said forward wall, and a handle on the forward end of said screw for rotating it between clamping and unclamping positions.

7. The combination according to claim 6, the means preventing relative rotation between said clamping members and wall comprising a non-circular portion on said second clamping member disposed within said slot, and a pin extending between said clamping members permitting relative axial but preventing relative rotational movement therebetween.

8. The combination according to claim 7, said lead screw having a cylindrical portion extending rearwardly from said threaded portion, and a bearing portion on said bracket rotatably supporting said cylindrical lead screw portion.

9. In a locking mechanism for a tilting arbor saw of the type having a frame with an arcuately slotted forward wall and an apron rockably mounted on said frame, a lead screw having an intermediate threaded portion, a cylindrical portion rearwardly of said threaded portion and a cylindrical portion extending forwardly from said threaded portion through said slot, bearing means on said apron rotatably supporting said rear cylindrical portion of the lead screw, a first clamping member threadably mounted on said threaded lead screw portion, a handle secured to the forward end of said lead screw, a second clamping member rotatably mounted on the forward cylindrical portion of said lead screw between said handle and said first clamping member, said first and second clamping members having flat surfaces engageable respectively, with the rear and forward surfaces of said forward wall, a non-circular portion on said second clamping member disposed within said slot to prevent relative rotation between the second clamping member and said wall, and a pin connecting said first and second clamping members through said slot and permitting relative axial movement therebetween but preventing relative rotational movement.

References Cited by the Examiner

UNITED STATES PATENTS 2,261,696 11/1941 Ocenasek _____ 143—36
2,265,407 12/1941 Tautz _____ 143—36

FOREIGN PATENTS 845,134 8/1960 Great Britain.

WILLIAM W. DYER, Jr., *Primary Examiner.*

W. D. BRAY, *Assistant Examiner.*